Aug. 21, 1956

H. E. SLOAN

2,759,733

EXPANSIBLE COLLET

Filed Aug. 21, 1951

Inventor:
Harry E. Sloan
by: Earle Steward
Attorneys.

United States Patent Office 2,759,733
Patented Aug. 21, 1956

2,759,733

EXPANSIBLE COLLET

Harry E. Sloan, Hartford, Conn., assignor to The Cushman Chuck Company, Hartford, Conn., a corporation of Connecticut Application August 21, 1951, Serial No. 242,813

32 Claims. (Cl. 279—2)

This invention relates to work-holding collets of the expanding type, and to a method of making them.

Previous collets of the type under consideration commonly provide angularly-spaced peripheral jaws and internal jaw-expanding mechanism normally operative to force the jaws outwardly by direct or indirect wedging action on the latter. While these previous collets are in many respects satisfactory, they are in another important respect seriously deficient due to the relatively wide gaps between the adjacent jaws thereof. This is true also of those collets having jaw-carriers which are longitudinally slotted to form the jaws integrally therewith. Thus, dirt and other foreign particles of a more harmful kind may readily pass through the gaps between adjacent jaws and become lodged in the internal expansion mechanism, only to interfere with the performance of the latter to the extent where the same may expand the jaws unevenly or even break one or more of the same.

It is an object of the present invention to provide an expanding collet, especially a collet of the type having its peripheral jaws formed integrally with a common carrier, of which the internal expansion mechanism is under all circumstances effectively sealed against dirt and other foreign matter, thereby overcoming the above-mentioned deficiency of previous expanding collets.

It is another object of the present invention to provide an expanding collet, and especially a collet of the integral jaw type, of which the jaws are adapted to seal the collet peripherally against dirt and other foreign matter by leaving no gaps between adjacent jaws when the collet is in its normal contracted condition.

A further object of the present invention is to provide an expanding collet of the integral jaw type, of which the adjacent jaws are normally urged into mutual engagement with each other by resilient internal forces, so that the jaws themselves act to seal the collet peripherally against dirt and other foreign matter when the collet is in its normal contracted condition.

Another object of the present invention is to provide an expanding collect of the integral jaw type of which the peripheral jaws form, by virtue of their normal gapless relative disposition, a normally continuous peripheral surface which, on expansion of the collet, affords a maximum contact area with the work thereon and permits the exertion of an optimum clamping force on the work without marking or marring the same.

It is a further object of the present invention to provide an expanding collet of the integral jaw type which, by virtue of the gapless and nearly gapless relative disposition of the jaws in their contracted and expanded conditions, respectively, is ideally suited for safely holding any suitable flexible or resilient matter, such as steel balls, for instance, which directly react with the jaws and form part of the internal expansion mechanism for advantageously expanding the jaws with an assuredly uniform pressure against the work thereon.

Another object of the present invention is to provide an expanding collet of which a common jaw-carrier may in an exceedingly simple manner be provided with a maximum number of integral jaws which are in engagement with each other when the collet is in its normal contracted condition, and which afford most uniform and optimum surface engagement with work thereon when the collet is expanded.

It is another object of the present invention to provide for an expanding collet a jaw-carrier of which a tubular length is divided by peripherally-spaced longitudinal hairline cracks therein into a plurality of jaws which are positively separated from each other by said cracks to permit their resilient expansion, yet are retained in most intimate and fitted surface engagement with each other when the collet is in its normal contracted condition.

A further object of the present invention is to devise a method of making an expanding collet, and especially the aforementioned integrally connected and normally closed jaws, in the simplest possible manner conducive to efficient mass production of the collet at relatively low cost.

Another object of the present invention is to devise a method of forming in a tubular portion of a jaw-carrier peripherally-spaced longitudinal cracks which are predetermined and entirely controlled as to their longitudinal extent and direction, and which positively divide the tubular portion of the carrier into integral expansible jaws which form in effect an uninterrupted outer peripheral surface when the jaws are in their normal contracted condition.

Still another object of the present invention is to devise a method of forming the aforementioned fine cracks in a jaw-carrier by providing the same with a preconceived pattern of thicknesswise reduced longitudinal wall portions which, on hardening of the jaw-carrier, become so brittle in comparison to the remainder of the jaw-carrier that they will usually crack on the first expansion of the latter, and any which did not then crack will assuredly crack on being tapped with a hammer, for instance.

Other objects and advantages will appear to those skilled in the art from the following, considered in conjunction with the accompanying drawings.

In the accompanying drawings, in which certain modes of carrying out the present invention are shown for illustrative purposes.

Figure 1:
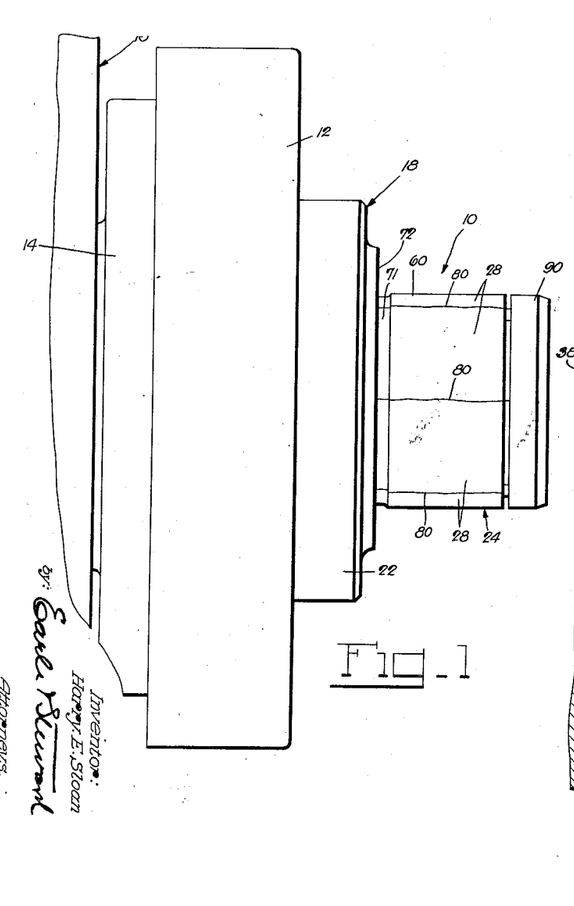
Fig. 1 is a side-elevational view of an expanding collet embodying the present invention.
Figure 2:
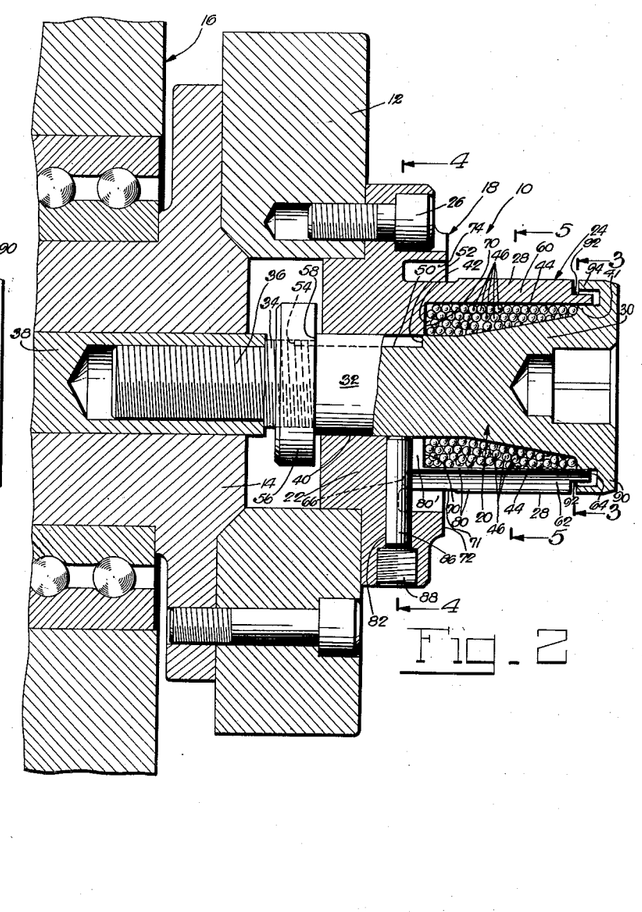
Fig. 2 is a longitudinal section through the same collet.

Referring to the drawings, and more particularly to Figs. 1 and 2 thereof, the reference numeral 10 generally designates a collect of the expanding type which, in the present instance, is shown carried by a face-plate 12 on the power-spindle 14 of a lathe or other machine tool 16. The collect 10 comprises, in the present instance, a jaw-carrier 18 and jaw-expanding mechanism 20.

Figures 3, 4, 5, 6:
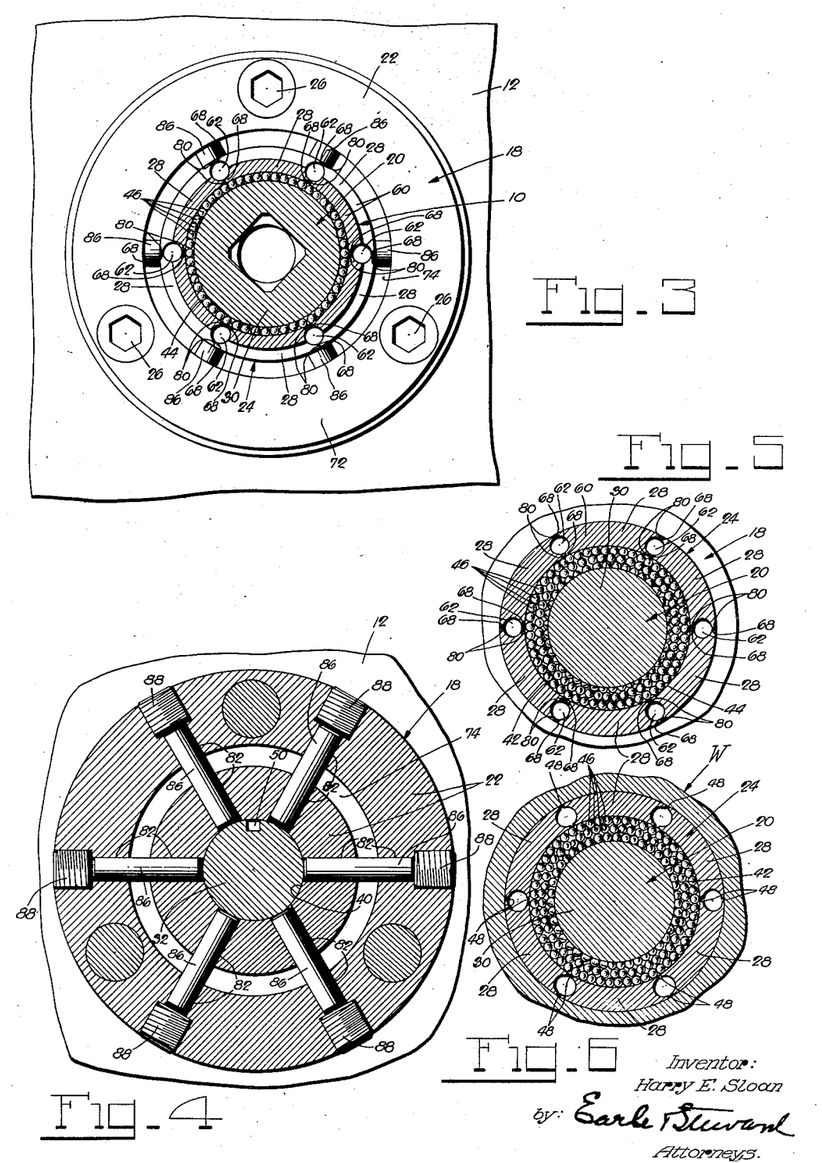
Figs. 3, 4 and 5 are cross-sections through the collet taken on the lines 3—3, 4—4 and 5—5, respectively, of Fig. 2.
Fig. 6 is a section similar to Fig. 5, but showing the jaws of the collet expanded against work thereon.

The jaw-carrier 18 provides a body or mounting portion 22 and an integral part-tubular extension 24, of which the body 22 is, in this instance, disc-shaped and mounted on the face plate 12 by a plurality of bolts 26 (Figs. 2 and 3). The part-tubular extension 24 of the carrier 18 is divided, in a manner explained hereinafter, into expansible jaws 28.

Figure 8:
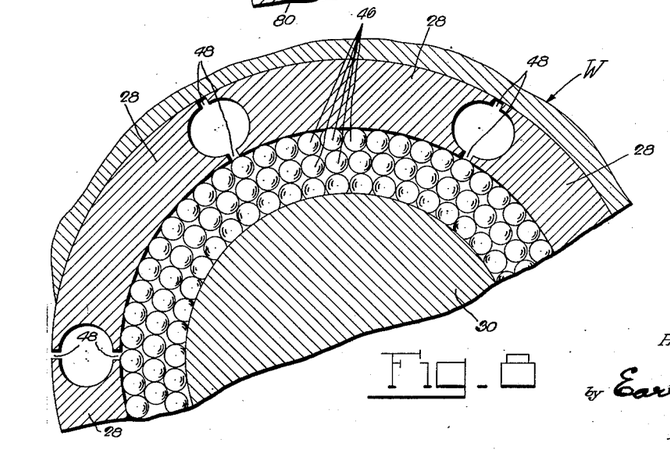

The jaw-expanding mechanism 20 comprises, in the present instance, a frusto-conical expander 30 having a cylindrical arbor 32 and successive diametrically-reduced shanks 34 and 36 of which the shank 36 is threadedly received by a draw-rod 38 (Fig. 2). The arbor 32 of the expander 30 is longitudinally slidable in an aperture 40 in the jaw-carrier 18, and the draw-rod 38 is longitudinally slidable in the power-spindle 14 of the machine tool 16. Any suitable provisions (not shown) may be made to hold the arbor 32 against rotation in the jaw-carrier 18. The frusto-conical expander 30 extends into the part-tubular extension 24 of the jaw-carrier, preferably coaxially thereof, and fits with its outer larger end 41 in, and hence closes, the adjacent end of the part-tubular extension 24 when the jaws 28 are in their normal contracted condition (Fig. 2). The space 42 between the expander 30 and the inner wall surface 44 of the part-tubular extension 24 of the jaw-carrier may be filled with any suitable flexible or resilient material which does not escape between the jaws 28 in their expanded condition and which acts to transmit any outward force from the expander 30 most uniformly to the jaws 28. The space 42 between the expander 30 and the inner wall surface 44 of the jaw-carrier is, in the present instance, filled with a multiplicity of steel balls 46 which in actual practice were found to be highly satisfactory in transmitting any outward force from the expander 30 most uniformly to the jaws 28. Thus, on moving the draw-bar 38 to the left from the position shown in Fig. 2, the expander 30 will exert outward component forces on the steel balls 46 which the latter will transmit most uniformly to the jaws 28, causing the latter to expand against work W, for instance, in the fashion shown in Figs. 6 and 8. For reasons explained hereinafter, the jaws 28 have only relatively small gaps 48 between them when they are in their expanded condition (Figs. 6 and 8), and are adapted to expand relatively small amounts, so that the jaws 28 and the outer end 41 of the expander 30 will securely retain the steel balls 46 in the space 42 under all conditions.

To provide for facile insertion of the steel balls 46 into the space 42 in the carrier extension 24, the arbor 32 is provided with a longitudinal groove 50 (Fig. 2) of which the end 52 is within the confines of the aperture 40 in the jaw-carrier under all conditions of use of the collet, and the opposite end 54 is some distance beyond the adjacent end of the aperture 40. Thus, for initially charging the assembled collet-unit 10 with steel balls 46 prior to its installation in a machine tool, or for recharging the assembled collet-unit with steel balls while the unit is removed from a machine tool, it is merely necessary to turn a threaded nut 56 on the shank 34 away from a shoulder 58 on the arbor 32 a sufficient amount to permit shifting of the jaw-expanding mechanism 20 to the right as viewed in Fig. 2 in order that the groove 50 may form a passage for the steel balls 46 from the outside of the jaw-carrier 18 to the space 42 therein. After the collet-unit 10 is charged with the correct amount of steel balls 46, the nut 56 is turned back on the shank 34 into engagement with the shoulder 58 on the arbor 32, thereby arresting the jaw-expanding mechanism against sliding movement in the jaw-carrier 18 into any position in which the steel balls 46 could escape from the space 42 into the groove 50. Thus, the collet-unit 10 may readily be assembled to the inclusion of the steel balls 46, and thereafter stored away, shipped or installed in a machine tool without danger of losing any of the inserted steel balls.

Figure 7:
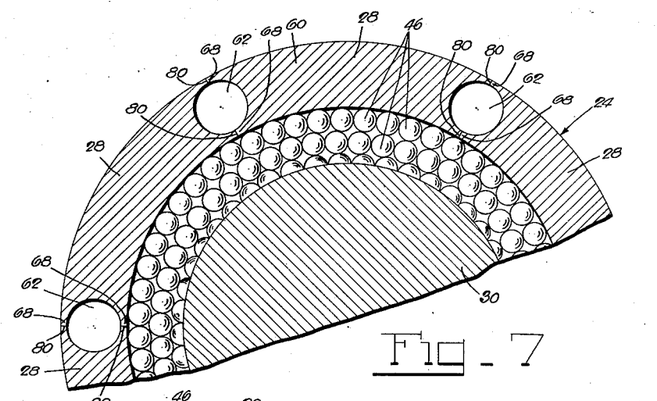
Figs. 7 and 8 are enlarged fragmentary parts of the sections shown in Figs. 5 and 6, respectively.
Figure 9:
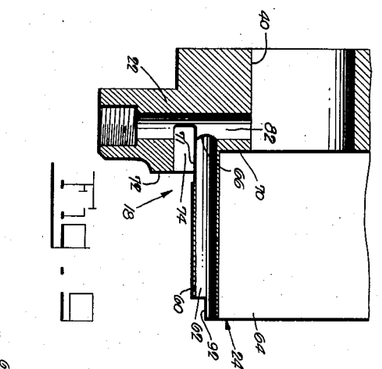
Fig. 9 is a fragmentary longitudinal section through the jaw-carrier of the instant collet in partly-finished form.

In accordance with an important aspect of the present invention, the jaws 28 are formed in the carrier-extension 24 by longitudinally cracking the same at peripherally-spaced intervals in a controlled fashion. To this end, the wall 60 of the part-tubular carrier-extension 24 is at angularly-spaced distances in this instance equiangularly spaced distances, longitudinally bored to provide bores or apertures 62 (Figs. 3, 5 and 9) from the open end 64 thereof to a uniform depth indicated at 66 in Figs. 2 and 9. More particularly, the bores 62 are, in the present instance, provided centrally of the uniform thickness of the tubular wall 60 so as to leave on diametrically-opposite sides of each bore 62 equal maximum-reduced wall-thicknesses 68 (Figs. 3, 5 and 7), except between the internal shoulder 70 in the jaw-carrier 18 and the inner end of each bore. Also, in the present instance, the bores 62 break through, or nearly through, the tubular wall 60 at the reduced inner end 71 thereof (Fig. 9). These maximum-reduced wall-thicknesses 68 are by far the thinnest and structurally weakest portions of the carrier-extension 24, and are subsequently cracked, as hereinafter described, to divide the carrier-extension into the separated jaws 28.

The front face 72 of the body 22 of the jaw-carrier may be machined to serve as a stop or rest for work to be held on the collet 10. In order that the work may be gripped substantially evenly by the expanded jaws 28, the latter extend inwardly beyond the stop-surface 72 (Figs. 2 and 10) with lateral outward clearance from the body 22 of the jaw-carrier at the circular recess 74 therein.

While the above-mentioned maximum-reduced wall-thicknesses 68 on opposite sides of each bore 62 would, due to their extreme structural weakness as compared to the rest of the carrier-extension 24, most likely crack satisfactorily along substantially rectilinear lines on first expansion of the collet, it is preferred to further control the cracking of these maximum-reduced wall-thicknesses. This further control over the cracking of the carrier-extension 24 is accomplished by hardening the jaw-carrier 18, and especially the extension 24 thereof, thereby leaving the thinnest portions thereof, i. e. the maximum reduced wall-thicknesses 68, far more brittle than the remainder of the jaw-carrier, with the result that these most brittle reduced wall-thicknesses will, on initial expansion of the jaw-carrier, usually crack throughout their longitudinal extent and along substantially rectilinear lines as indicated at 80 in Figs. 1, 2, 3, 7 and 10.

Figure 10:
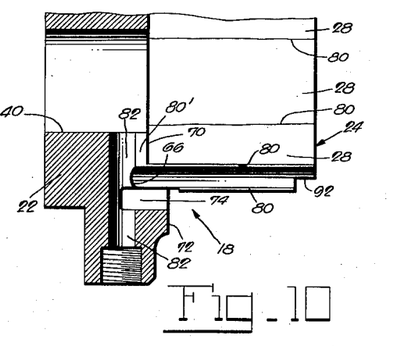
Fig. 10 is a section similar to Fig. 9, showing the jaw-carrier in its finished form.

In order further to control the cracking of the carrier-extension 24 and prevent the spread of the cracks 80 into the body 22 of the carrier, the latter is also provided with transverse bores 82 (Figs. 2, 4, 9 and 10) into which the longitudinal bores 62, respectively, lead and at which the latter terminate. Thus, the transverse bores 82, which extend to the aperture 40, not only prevent the spread of the cracks 80 in the reduced wall-thicknesses 68 into the body 22 of the carrier, but prevent a like spread into the carrier body 22 of the crack extensions 80' from the inner ends of the cracks 80, respectively, to the adjacent aperture 40 (Figs. 2 and 10). The crack-extensions 80' will in most instances be formed to the aperture 40 simultaneously with the above-described formation of the cracks 80. However, occasionally one or more pairs of jaws 28 will fail to crack apart, or one or more crack-extensions 80' will terminate short of the aperture 40, during the above-mentioned cracking procedure, in which case recourse may be had to suitable expediencies to complete the cracking of the jaw-carrier. Thus, a designated but non-formed crack in a jaw-carrier may be formed by tapping the latter with a hammer, for instance, especially in the area in which the crack is to appear. To this end, a tool described hereinafter has been found very helpful in forming an incomplete or lacking crack or cracks in a jaw-carrier on tapping the same.

The cracks thus obtained in the carrier-extension 24 are of the hairline type, wherefore the jaws 28 are in their normal contracted condition in abutting relation with each other and form an uninterrupted outer peripheral surface. The cracks in the carrier-extension 24 are in fact so fine that they effectively seal the interior thereof against dust and other foreign matter when the jaws 28 are in their normal contracted condition.

To seal the interior of the carrier-extension 24 otherwise against dirt and other foreign matter, such as metal chips, for instance, the transverse bores 82 in the jaw-carrier 18 appropriately receive filling pins 86, respectively, which may be held against removal therefrom by threaded plugs 88 in the outer enlarged ends of the respective bores 82. Further, the large outer end 41 of the expander 30 may be extended to form a closure cap 90 over the open ends of the longitudinal bores 62 in the carrier-extension 24 (Fig. 2). To admit work or other articles onto the normally-contracted jaws 28 to be gripped thereby on normal expansion of the latter, the closure-cap 90 on the outer end of the expander 30 is preferably within the confines of the outer surfaces of the jaws 20 when the latter are in their normal contracted condition. To this end, the outer ends of the jaws 28 are undercut as at 92, and a flange-like portion 94 of the closure-cap 90 is in overlapping relation with these outer jaw ends, sufficiently spaced, however, from the latter to permit normal expansion of the jaws 28. Also, the longitudinal extent of the overlap of the flange portion 94 of the closure-cap 90 over the outer ends of the jaws 28 is such as to permit inward movement, without interference from the latter, of the jaw-expanding mechanism 20 requisite for the expansion of the jaws 28.

The instant collet, made in accordance with the method hereinbefore described, secures many important advantages. Thus, the interior of the instant collet is at all times effectively sealed against dirt and other foreign matter, thereby forestalling uneven expansion of the jaws or damage to the same by reason of a foreign body or bodies in the collet. By virtue of the division of the carrier-extension 24 into the jaws 28 by the fine cracks in the former and the according gapless relative disposition of the jaws in their normal contracted condition, the jaws combine to form a normally continuous peripheral surface which, on expansion of the collet, affords a maximum contact area with the work thereon and permits the exertion of an optimum clamping force on the work without marking or marring the same. Further by virtue of the gapless and nearly gapless relative disposition of the jaws 28 in their contracted and expanded conditions, respectively, the instant collet is ideally suited for safely retaining the steel balls 46 or any other substitute flexible or resilient materials which may be used advantageously for most uniform expansion of the jaws at all times. Due to the simple formation of the jaws on the carrier by mere cracks in the latter, a maximum number of normally closed jaws may be formed which, by reason of their optimum overall clamping surface for a given-size collet and the close approximation of the clamping surface of each one of the numerous jaws to the work thereon, afford most uniform and optimum surface-engagement with the work when the collet is expanded into clamping engagement therewith. The hereinbefore described method of forming the jaws on a common jaw-carrier is not only highly conducive to efficient mass-production of the collet at relatively low cost, but affords a reliable control over the featured partial cracking of the jaw-carrier for the formation of the jaws thereon. Thus, the cracks in the tubular portion or extension of the carrier are predetermined and entirely controlled as to their longitudinal extent and direction by the simple expedient of the longitudinal and transverse bores in the carrier extension. Additional control over the cracking of the tubular carrier extension along lines which are nearly rectilinear, is obtained by accomplishing the cracking of the jaw-carrier on its first expansion following its hardening.

The steel balls 46, having been shown as an example of an expander medium having the essential characteristics and advantages of a fluid expander without involving the exacting task of sealing the latter against leakage, were found entirely satisfactory for the purpose in mind. Given by way of example only, a collet actually made of the same construction and the same proportional dimensions as that shown in Figs. 1 to 3, with an actual outside jaw diameter of 2⅛ inches and the same expander taper as shown, received in the space 42 approximately 3,000 steel balls each of which was 3/32 of an inch in diameter. This collet performed quite satisfactorily and clearly demonstrated the fluid characteristics of the steel balls 46 which expanded the jaws 28 most uniformly and, after expansion of the latter, returned the expander 30 to its nonoperative position (Fig. 2) solely under the compelling inherent contracting forces of the jaws.

Figure 11:
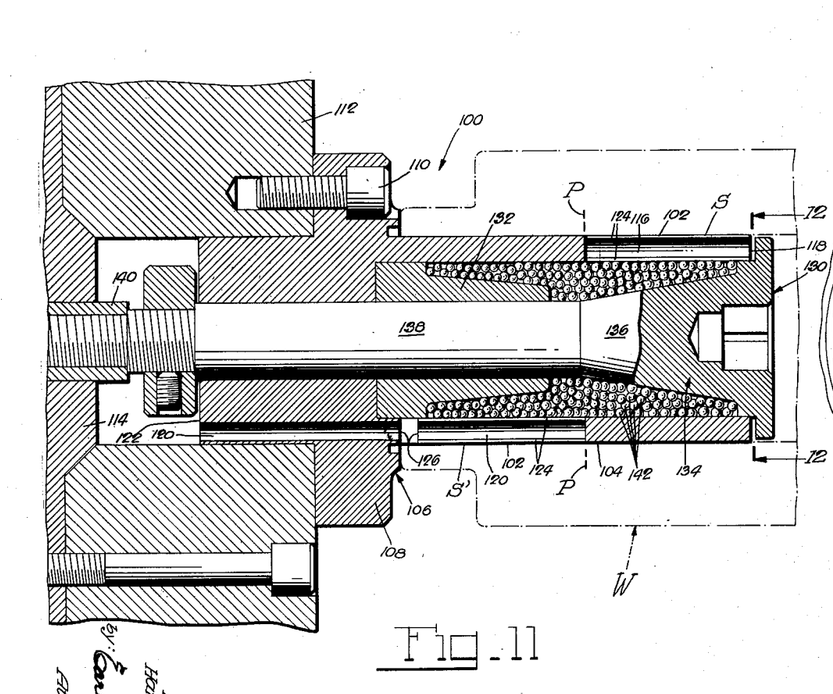
Fig. 11 is a longitudinal section through an expanding collect embodying the present invention in a modified manner.
Figure 12:
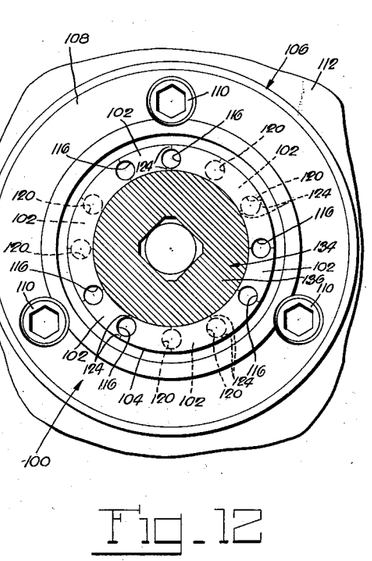
Fig. 12 is a section on the line 12—12 of Fig. 11.

Figs. 11 and 12 show a modified collet 100 which distinguishes from the previously described collet 10 primarily by having longitudinally spaced sets of circumferential jaws 102 in the part-tubular extension 104 of the jaw-carrier 106. The jaw-carrier 106 has also a body or mounting portion 108 from which the part-tubular extension 104 projects and which may be bolted at 110 to a face plate 112 on the power-driven spindle 114 of a lathe or other machine tool. The jaws 102 of the longitudinally spaced sets S and S' are arranged in staggered relation to each other (Figs. 12 and 13), and the jaws of both sets start, in the present instance, from an approximately median transverse plane P (Fig. 11) between the ends of the part-tubular carrier-extension 104.

To form the jaws 102 of the set S, the cylindrical wall of the carrier extension is first longitudinally bored, as at 116, from the outer end 118 thereof to the median transverse plane P (Figs. 11 and 12). More particularly, the bores 116 are arranged in angularly spaced pairs (Fig. 12) for the formation between them, but rearwardly thereof, of the staggered jaws 102 of the other set S'.

Figures 13, 14:
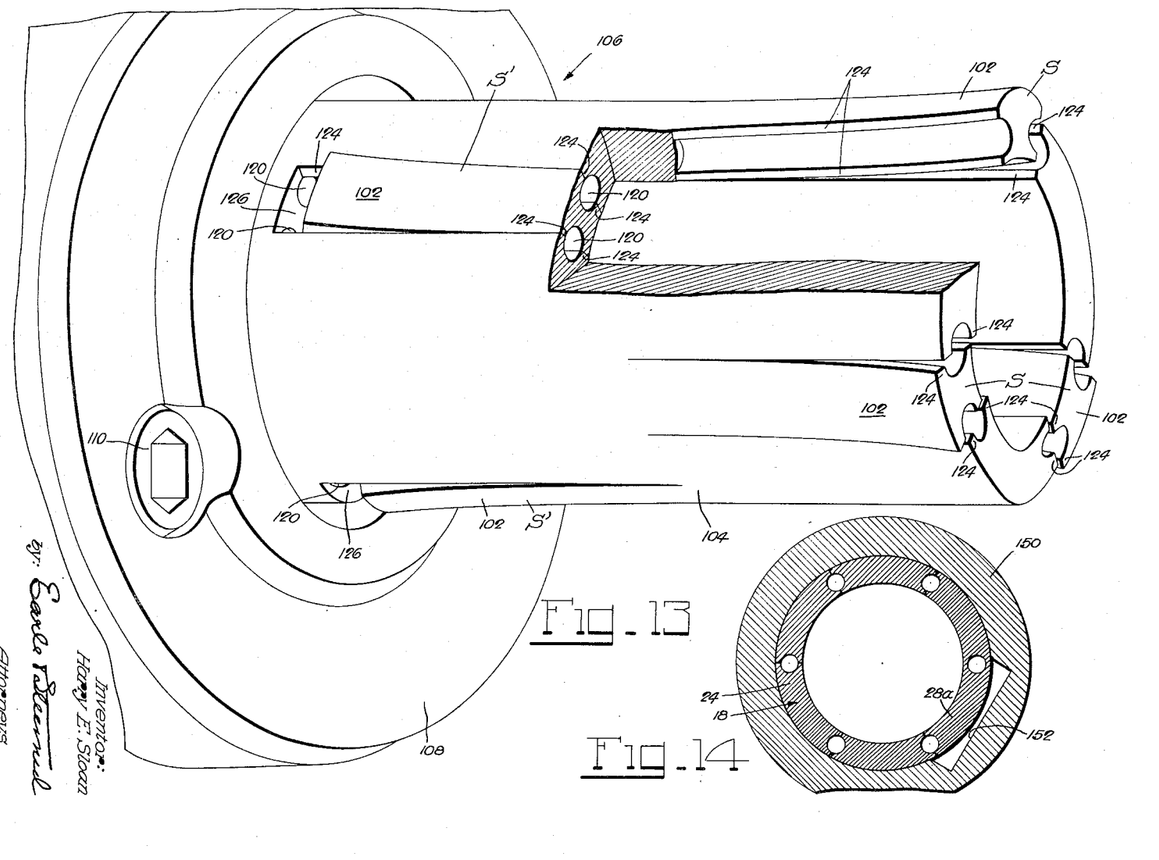
Fig. 13 is an enlarged perspective view, partly in section, of the jaw-carrier of the modified collect shown in Fig. 11.
Fig. 14 is a cross-section through a jaw-carrier and an applied tool for cracking adjacent jaws apart.

To form the jaws 102 of the other set S', the jaw-carrier 106 is longitudinally bored, as at 120, from the inner end 122 of the body portion 108 thereof, through the latter and into the carrier extension 104 to the median transverse plane P (Figs. 11 and 13). The bores 120 are arranged in similar pairs as the bores 116 and alternate with the latter pairs (Fig. 12) in order to attain the desired staggered relation between the jaws to be formed of the sets S and S'.

The bores 116 and 120 leave the cylindrical wall of the carrier-extension 104 with greatly reduced wall thicknesses 124 which in the hereinbefore described manner may be cracked to form the jaws 102.

Since the longitudinal cracks in the rear of the carrier-extension 104 separate only the opposite side edges of the jaws of the rear set S' from the remainder of the carrier-extension, further provisions are made to separate also the free or rear ends of the jaws of this rear set from the remainder of the carrier extension. To this end, the carrier-extension 104 is, preferably prior to the cracking thereof, appropriately slotted at 126. As shown in Fig. 13, each slot 126 is preferably of the same peripheral extent as the adjacent jaw 102, thereby also preventing the susbequently formed cracks from extending into the bored body portion of the carrier.

The instant modified collet 100 is further provided with jaw-expanding mechanism 130 which, in the present instance, comprises fixed and movable expanders 132 and 134, respectively. The fixed expander 132, which is generally frusto-conical, is suitably mounted in the inner end of the part-tubular carrier extension 104, while the movable expander 134 has a frusto-conical head 136 in the open end of the carrier-extension 104, and a shank 138 which passes through the fixed expander 132 and the body portion 108 of the jaw-carrier 106 and is releasably connected with a draw-bar 140.

As in the previous exemplary collet 10, the remaining space in the carrier-extension 104 is shown filled with steel balls 142 which, on retraction of the expander 134 toward the other expander 132, will expand the jaws 102 of both sets S and S' most uniformly. Also as in the previous exemplary collet 10, the expander 134 of the instant collet will, after expansion of the latter, be returned to its non-operative position (Fig. 11) by the steel balls 142 under the compelling inherent contracting forces of the jaws 102 of both sets S and S', when the taper of each expander 132 and 134 and the size of the steel balls are properly selected.

Fig. 13 shows the jaw-carrier 106 without the internal expansion mechanism 130, although the jaws 102 of both sets are for illustrative purposes shown in somewhat exaggerated expanded condition. The instant modified collet 100 is, of course, of considerable advantage where the character of the work W to be held thereon requires even clamping pressure over a larger longitudinal extent than is afforded by the previously described collet 10 with its single set of jaws.

Fig. 14 shows a tool 150 which may be used advantageously for cracking apart two adjacent jaws of either of the described collets which failed to crack apart during the hereinbefore described regular cracking procedure. The tool 150 is essentially a sleeve in which the part-tubular extension of a jaw-carrier, such as the extension 24 of the carrier 18, for instance, is fittedly receivable. The sleeve 150 is provided with an inner longitudinal groove 152 which is preferably of a width slightly in excess of that of a jaw, so that any jaw not cracked apart from its adjacent jaw, such as the jaw 28a, for instance, may be aligned with, and positioned fully within the confines of, the groove 152, as shown. In many instances, mere internal tapping with a hammer against the non-cracked jaw over the groove 152 will result in cracking the same. However, if mere tapping of a non-cracked jaw with a hammer should in some instances prove unsuccessful, the grooved sleeve 152 may equally advantageously be used with any suitable power-expander (not shown) which may be inserted in a jaw-carrier in the sleeve 152.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An expanding collet, comprising a jaw-carrier having an integral tubular wall portion interrupted by peripherally spaced longitudinal gapless cracks, at least two of which define between them, and extend throughout the length of, an expansible jaw which in its non-expanded condition abuts the remainder of said wall portion at said cracks; and jaw-expanding mechanism in said tubular wall portion underlying and supporting said jaw throughout its length when in expanded condition.

2. An expanding collet, comprising a jaw-carrier having an integral tubular wall portion interrupted by peripherally spaced longitudinal gapless cracks extending depthwise throughout the thickness of said wall portion and dividing the latter into, and extending the length of, expansible jaws having in their nonexpanded condition an uninterrupted outer peripheral surface; and jaw expanding mechanism in said tubular wall portion underlying and supporting said jaws throughout their length when in expanded condition.

3. An expanding collet, comprising a jaw-carrier having an integral tubular wall portion open at one end and provided with a pair of peripherally spaced longitudinal gapless cracks defining between them an expansible jaw which in its non-expanded condition abuts the remainder of said wall portion at said cracks; means closing the open end of said tubular wall portion; an expander in said tubular wall portion in spaced relation with the inner surface thereof; and a non-compressible but deformable medium in the space between said expander and inner surface of said tubular wall portion for transmitting outward pressure from said expander to said jaws.

4. An expanding collet, comprising a jaw-carrier having an integral tubular wall portion open at one end and provided with peripherally-spaced longitudinal gapless cracks extending from said open end and dividing said wall portion into expansible jaws which in their non-expanded condition are in abutting relation with each other at said cracks; means closing the open end of said tubular wall portion; an expander in said tubular wall portion in spaced relation with the inner surface thereof; and a non-compressible but deformable medium in the space between said expander and inner surface of said tubular wall portion for uniformly transmitting outward pressure from said expander to said jaws.

5. An expanding collet, comprising a jaw-carrier having an integral tubular wall extension open at one end and closed at the other end and provided with peripherally-spaced longitudinal grapless cracks extending to said open end and dividing said tubular extension into expansible jaws which in their non-expanded condition are in abutting relation with each other at said cracks; a tapering expander reciprocable longitudinally in, and spaced from the inner surface of, said tubular extension and having an end substantially fitting in and closing the open end of said extension; and a multiplicity of steel balls in the space between said expander and inner surface of said extension for uniformly transmitting outward pressure from said expander to said jaws.

6. An expanding collet, comprising an apertured jaw-carrier having an integral open-end tubular wall extension in axial alignment with said aperture, said extension being provided with peripherally-spaced longitudinal gapless cracks extending to said open end and dividing said extension into expansible jaws which in their non-expanded condition are in abutting relation with each other at said cracks; a draw-bar guided for axial reciprocation in said aperture in the carrier and provided with a frusto-conical expander projecting into said extension in spaced relation with the inner surface thereof and having an end substantially fitting in and closing the open end of said extension; and a multiplicity of steel balls in the space between said expander and inner surface of said extension for uniformly transmitting outward pressure from said expander to said jaws.

7. An expanding collet, comprising a jaw-carrier having a tubular wall portion of substantially continuous periphery open at one end and provided in its tubular wall with spaced longitudinal apertures leaving remaining wall sections of reduced thickness in said tubular portion along said apertures, and longitudinal gapless cracks substantially in the smallest remaining wall thickness along said apertures, said apertures and cracks each extending throughout the length of, and dividing said tubular wall portion into, expansible jaws which in their nonexpanded condition are in abutting relation with each other at said cracks; and jaw-expanding mechanism in said tubular wall portion underlying and supporting said jaws throughout their length when in expanded condition.

8. An expanding collet, comprising a jaw-carrier having a tubular wall portion open at one end and provided in its tubular wall with spaced longitudinal first apertures and longitudinal gapless cracks substantially in the smallest remaining wall thicknesses along said apertures, said apertures and cracks extending to the open end of said tubular wall portion and said cracks dividing the latter into expansible jaws which in their non-expanded condition are in abutting relation with each other at said cracks, said tubular wall portion having also transverse through-apertures into which said first apertures, respectively, lead and at which the latter and said cracks terminate; and jaw-expanding mechanism in said tubular wall portion.

9. An expanding collet, comprising a jaw-carrier having a tubular wall portion open at one end and provided in its tubular wall with spaced longitudinal first holes and longitudinal gapless cracks substantially in the smallest remaining wall thicknesses on opposite sides of said holes, said holes and cracks extending to the open end of said tubular wall portion and said cracks dividing the latter into expansible jaws which in their non-expanded condition are in abutting relation with each other at said cracks, said tubular wall portion having also transverse through-holes into which said first holes, respectively, lead and at which the latter and said cracks terminate; filling plugs in said transverse holes, respectively; and jaw-expanding mechanism in said tubular wall portion, said mechanism having a part substantially fitting in and closing said open end of said tubular wall portion and having an extension in covering relation with the outer ends of said first holes.

10. An expanding collet, comprising an apertured jaw-carrier having an integral open-end tubular wall extension in axial alignment with said aperture, said extension being provided with peripherally-spaced longitudinal gapless cracks extending to said open end and dividing said extension into expansible jaws which in their non-expanded condition are in abutting relation with each other at said cracks; and jaw-expanding mechanism comprising a draw-bar axially reciprocable with a sliding fit in said aperture; a frusto-conical expander on said draw-bar projecting into said extension in spaced relation with the inner surface thereof and having an end substantially fitting in and closing the open end of said extension, and a multiplicity of steel balls in the space between said expander and inner surface of said extension for uniformly transmitting outward pressure from said expander to said jaws on movement of the former inwardly of said extension within a predetermined permissible range, said draw-bar having a longitudinal groove adapted for the passage of steel balls into the interior of said tubular extension; and the end of said groove nearest said expander being within the confines of said aperture when said expander is anywhere within said permissible range of movement.

11. An expanding collet, comprising a jaw-carrier having a tubular wall portion provided with an aperture and a pair of adjacent longitudinal gapless cracks starting intermediate the length of said tubular wall portion and extending to said aperture to define an expansible jaw which in its non-expanded condition abuts the remainder of said wall portion at said cracks; and jaw-expanding mechanism in said tubular wall portion.

12. An expanding collet, comprising a jaw-carrier having a tubular wall portion provided with peripherally spaced apertures and pairs of adjacent longitudinal gapless cracks starting intermediate the length of said tubular wall portion and extending to said apertures, respectively, to define expansible jaws, respectively, which in their non-expanded condition abut the remainder of said wall portion at said cracks; and jaw-expanding mechanism in said tubular wall portion.

13. An expanding collet, comprising a jaw-carrier having a tubular wall portion open at one end and provided with an aperture near the other end and with longitudinally spaced pairs of peripherally spaced longitudinal gapless cracks of which the cracks of one pair nearest said open tubular wall end extend to the latter and define an expansible jaw, and the cracks of the other pair extend to said aperture and define another expansible jaw, said jaws being in their non-expanded condition in abutting relation with the remainder of said tubular wall portion at said cracks; and jaw-expanding mechanism in said tubular wall portion.

14. An expanding collet, comprising a jaw-carrier having a tubular wall portion open at one end and provided with peripherally spaced apertures near the other end and with longitudinally spaced sets of pairs of peripherally spaced longitudinal gapless cracks of which the crack pairs of one set nearest said open tubular wall end extend to the latter and define first expansible jaws, respectively, and the crack pairs of the other set extend to said apertures, respectively, and define other expansible jaws, respectively, each of said jaws being in its non-expanded condition in abutting engagement with the adjacent jaws; and jaw-expanding mechanism in said tubular wall portion.

15. An expanding collet as set forth in claim 16, in which said jaw-expanding mechanism comprises a first tapering expander projecting into said tubular wall portion from said other end thereof and covering said apertures with its larger end; another tapering expander reciprocable longitudinally in said tubular wall portion and closing with its larger end said open tubular wall end; and a multiplicity of steel balls in said tubular wall portion between said expanders for uniformly transmitting outward pressure from the latter to said jaws.

16. A jaw-carrier for an expanding collet, comprising a member having an integral tubular wall portion provided with peripherally-spaced longitudinal gapless cracks extending depthwise throughout the thickness of said wall portion and dividing the latter into expansible jaws having in their non-expanded condition an uninterrupted outer peripheral surface.

17. A jaw-carrier for an expanding collet, comprising a member having an integral tubular wall portion open at one end and provided with peripherally-spaced longitudinal gapless cracks extending lengthwise to said open end and depthwise throughout the thickness of said wall portion, said cracks dividing said tubular wall portion into expansible jaws having in their non-expanded condition an uninterrupted outer peripheral surface.

18. A jaw-carrier for an expanding collet, comprising a member having an integral tubular wall portion open at one end and provided in its tubular wall with spaced longitudinal apertures and longitudinal gapless cracks substantially in the smallest remaining wall thicknesses along said apertures, said apertures and cracks extending to said open end of the tubular wall portion and said cracks dividing the latter into expansible jaws which in their non-expanded condition are in abutting relation with each other at said cracks.

19. A jaw-carrier for an expanding collet as set forth in claim 18, in which the wall of said tubular portion is of uniform thickness throughout, and said apertures are identical cylindrical bores leaving on diametrically opposite sides of each bore maximum-reduced wall thicknesses, respectively, in which said cracks extend substantially rectilinearly.

20. A jaw-carrier for an expanding collet as set forth in claim 18, in which the wall of said tubular portion is of uniform thickness throughout, and said apertures are identical cylindrical bores located centrally of the thickness of said wall so as to leave on diametrically opposite sides of each bore equal maximum-reduced wall thicknesses respectively, in which said cracks extend substantially rectilinearly.

21. A jaw-carrier for an expanding collet, comprising a member having an integral tubular wall portion open at one end and provided in its tubular wall with spaced longitudinal apertures and longitudinal gapless cracks substantially in the smallest remaining wall thicknesses along said apertures, said apertures and cracks extending to the open end of said tubular wall portion and said cracks dividing the latter into expansible jaws which in their non-expanded condition are in abutting relation with each other at said cracks, said tubular wall portion having also transverse through-holes into which said apertures, respectively, lead and at which the latter and said cracks terminate.

22. A jaw-carrier for an expanding collet, comprising a member having an integral tubular wall portion provided with an aperture and a pair of adjacent longitudinal gapless cracks starting intermediate the length of said tubular wall portion and extending to said aperture to define an expansible jaw which in its non-expanded condition abuts the remainder of said wall portion at said cracks.

23. A jaw-carrier for an expanding collet, comprising a member having a tubular wall portion provided with peripherally spaced apertures and pairs of adjacent longitudinal gapless cracks starting intermediate the length of said tubular wall portion and extending to said apertures, respectively, to define expansible jaws, respectively, which in their non-expanded condition abut the remainder of said wall portion at said cracks.

24. A jaw-carrier for an expanding collet, comprising a member having a tubular wall portion open at one end and provided with an aperture near the other end and with longitudinally spaced pairs of peripherally spaced longitudinal gapless cracks of which the cracks of one pair nearest said open tubular wall end extend to the latter and define an expansible jaw, and the cracks of the other pair extend to said aperture and define another expansible jaw, said jaws being in their non-expanded condition in abutting engagement with the remainder of said tubular wall portion at said cracks.

25. A jaw-carrier for an expanding collet, comprising a member having a tubular wall portion open at one end and provided with peripherally spaced apertures near the other end and with longitudinally spaced sets of pairs of peripherally spaced longitudinal gapless cracks of which the crack pairs of one set nearest said open tubular wall end extend to the latter and define first expansible jaws, respectively, and the crack pairs of the other set extend to said apertures, respectively, and define other expansible jaws, respectively, each of said jaws being in its non-expanded condition in abutting engagement with the adjacent jaws.

26. A jaw-carrier for an expanding collet, comprising a tubular wall provided with an aperture adjacent one end thereof and with a pair of spaced longitudinal holes extending from said one tubular wall end through said aperture and terminating intermediate the length of said tubular wall, each of said holes leaving on opposite sides thereof the smallest wall thicknesses, respectively, of said tubular wall, and said smallest wall-thicknesses being longitudinally cracked between said aperture and the inner ends of said holes to provide an expansible jaw which in its non-expanded condition laterally abuts the remainder of said tubular wall at said cracks.

27. As an article of manufacture, a jaw-carrier having a tubular wall portion open at one end and provided in its tubular wall with a pair of spaced longitudinal holes extending from the open end of said tubular wall portion to a uniform depth, each of said holes leaving on opposite sides thereof reduced wall-thicknesses, respectively, which are adapted to be cracked so as to define an expansible jaw which in its normal contracted condition abuts the remainder of said wall portion at the cracks, at least the outer surface of said tubular wall portion, including certain of the reduced wall thicknesses being hardened and embrittled to facilitate cracking along said holes when desired.

28. As an article of manufacture, a jaw-carrier having a tubular wall portion open at one end and provided in its tubular wall with spaced longitudinal holes extending from the open end of said tubular wall portion to a uniform depth, each of said holes leaving on opposite sides thereof reduced wall thicknesses, respectively, adapted to be cracked for dividing the cracked length of said tubular wall portion into expansible jaws which in their normal contracted condition are in abutting relation with each other, at least the outer surface of said tubular wall portion, including certain of the reduced wall thicknesses being hardened and embrittled to facilitate cracking along said holes when desired.

29. As an article of manufacture, a jaw-carrier having a tubular wall portion open at one end and of uniform wall thickness throughout, said tubular portion being provided in its wall with longitudinally extending, spaced identical cylindrical bores equally extending depthwise from said open end of said tubular wall portion and leaving on diametrically opposite sides of each bore maximum-reduced wall thicknesses, respectively, adapted to be cracked substantially rectilinearly for dividing the corresponding length of said tubular wall portion into expansible jaws which in their normal contracted condition are in abutting relation with each other, at least the outer surface of said tubular wall portion, including certain of the reduced wall thicknesses being hardened and embrittled to facilitate cracking along said bores when desired.

30. As an article of manufacture, a jaw-carrier having a tubular wall portion open at one end and of uniform wall thickness throughout, said tubular portion being provided in its wall with longitudinally extending, spaced identical cylindrical bores equally extending depthwise from said open end of said tubular wall portion and located centrally of the thickness of said wall so as to leave on diametrically opposite sides of each bore equal maximum-reduced wall thicknesses, respectively, adapted to be cracked substantially rectilinearly for dividing the corresponding length of said tubular wall portion into expansible jaws which in their normal contracted condition are in abutting relation with each other, at least the outer surface of said tubular wall portion, including certain of the reduced wall thicknesses being hardened and embrittled to facilitate cracking along said bores when desired.

31. As an article of manufacture, a jaw-carrier having a tubular wall portion open at one end and provided in its tubular wall with spaced longitudinal apertures extending from the open end of said tubular wall portion through a uniform distance, and transverse through-holes into which said apertures, respectively, lead and at which the latter terminate, each of said apertures reducing the wall thickness of said wall thereat and said reduced wall thicknesses being adapted to be cracked for dividing the corresponding length of said tubular wall portion into expansible jaws which in their normal contracted condition are in abutting relation with each other, and said transverse holes being adapted to prevent cracking of said tubular wall portion beyond said apertures.

32. As an article of manufacture, a jaw-carrier having a tubular wall provided with an aperture adjacent one end thereof and with a pair of spaced longitudinal holes extending from said one tubular wall end through said aperture and terminating intermediate the length of said tubular wall, each of said holes leaving on opposite sides thereof the smallest wall thicknesses, respectively, of said tubular wall, said smallest wall-thicknesses being adapted to be longitudinally cracked between said aperture and the inner ends of said holes to provide an expansible jaw which in its normal contracted condition will laterally abut the remainder of said tubular wall at the cracks.

References Cited in the file of this patent

UNITED STATES PATENTS

| | | |
|---|---|---|
| 245,023 | Sisson | Aug. 2, 1881 |
| 487,194 | Mossberg | Nov. 29, 1892 |
| 1,464,551 | Urquhart | Aug. 14, 1923 |
| 1,498,748 | Pierce, Jr. | June 24, 1924 |
| 1,548,730 | Mirfield | Aug. 4, 1925 |
| 1,611,122 | Mirfield | Dec. 14, 1926 |

(Other references on following page)

UNITED STATES PATENTS

| | | |
|---|---|---|
| 1,621,380 | Ruder | Mar. 15, 1927 |
| 2,134,749 | Burt | Nov. 1, 1938 |
| 2,139,733 | Derrig | Dec. 13, 1938 |
| 2,145,864 | Denneen | Feb. 7, 1939 |
| 2,153,035 | Burt | Apr. 4, 1939 |
| 2,219,124 | Bandy | Oct. 22, 1940 |
| 2,293,085 | Stieber | Aug. 18, 1942 |
| 2,431,961 | Phillips et al. | Dec. 2, 1947 |
| 2,460,414 | Fuller | Feb. 1, 1949 |
| 2,472,554 | Volis | June 7, 1949 |

FOREIGN PATENTS

| | | |
|---|---|---|
| 579,270 | Germany | June 22, 1933 |
| 585,833 | Germany | Oct. 11, 1933 |